United States Patent
Han (10) Patent No.: US 6,229,574 B1
(45) Date of Patent: May 8, 2001

(54) SCREEN RATIO CONVERTER FOR DIGITAL TV

(75) Inventor: Dongil Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/131,398

(22) Filed: Aug. 7, 1998

(30) Foreign Application Priority Data

Aug. 28, 1997 (KR) .................................................. 97/42186

(51) Int. Cl.$^7$ ..................................................... H04N 5/46
(52) U.S. Cl. .......................... 348/555; 348/556; 348/558; 348/445
(58) Field of Search ..................................... 348/553, 554, 348/555, 556, 558, 564, 565, 581, 588, 441, 448, 561; H04N 7/01, 11/20, 5/46, 3/27

(56) References Cited

U.S. PATENT DOCUMENTS

| | | | |
|---|---|---|---|
| 5,365,276 | * 11/1994 | Imai et al. | 348/556 |
| 5,548,340 | * 8/1996 | Bertram | 348/559 |
| 5,943,097 | * 8/1999 | Horii | 348/556 |
| 5,973,748 | * 10/1999 | Horiguchi et al. | 348/554 |

* cited by examiner

*Primary Examiner*—Michael Lee (57) ABSTRACT

A system for converting from an image with one aspect ratio to another aspect ratio includes a plurality of simple converters and a selector which selects one of the plurality of converters to convert from one image size to another. The selector divides the image into a plurality of pixel portions and establishes a rule to select the appropriate converter for each of the plurality of pixel portions.

12 Claims, 6 Drawing Sheets

SCREEN RATIO CONVERTER FOR DIGITAL TV

BACKGROUND OF INVENTION

The present invention is related to a converter outputting appropriate screen resolutions according to different aspect ratios, and more particularly for a digital television system.

In the United States, the digital television (TV) standard allows many types of video image formats, with different screen resolutions of 480×640, 480×704, 720×1280, 1080×1920. Thus, a digital TV system must be capable of processing a variety of image sizes, especially because image formats may constantly change, even for the same channel. Additionally, each image size may have different aspect ratios of either 4:3 or 16:9. If the input aspect ratio is 4:3 and the display screen aspect ratio is 16:9, the image may be shown in either 4:3 or 16:9 aspect ratios.

Figure 1:
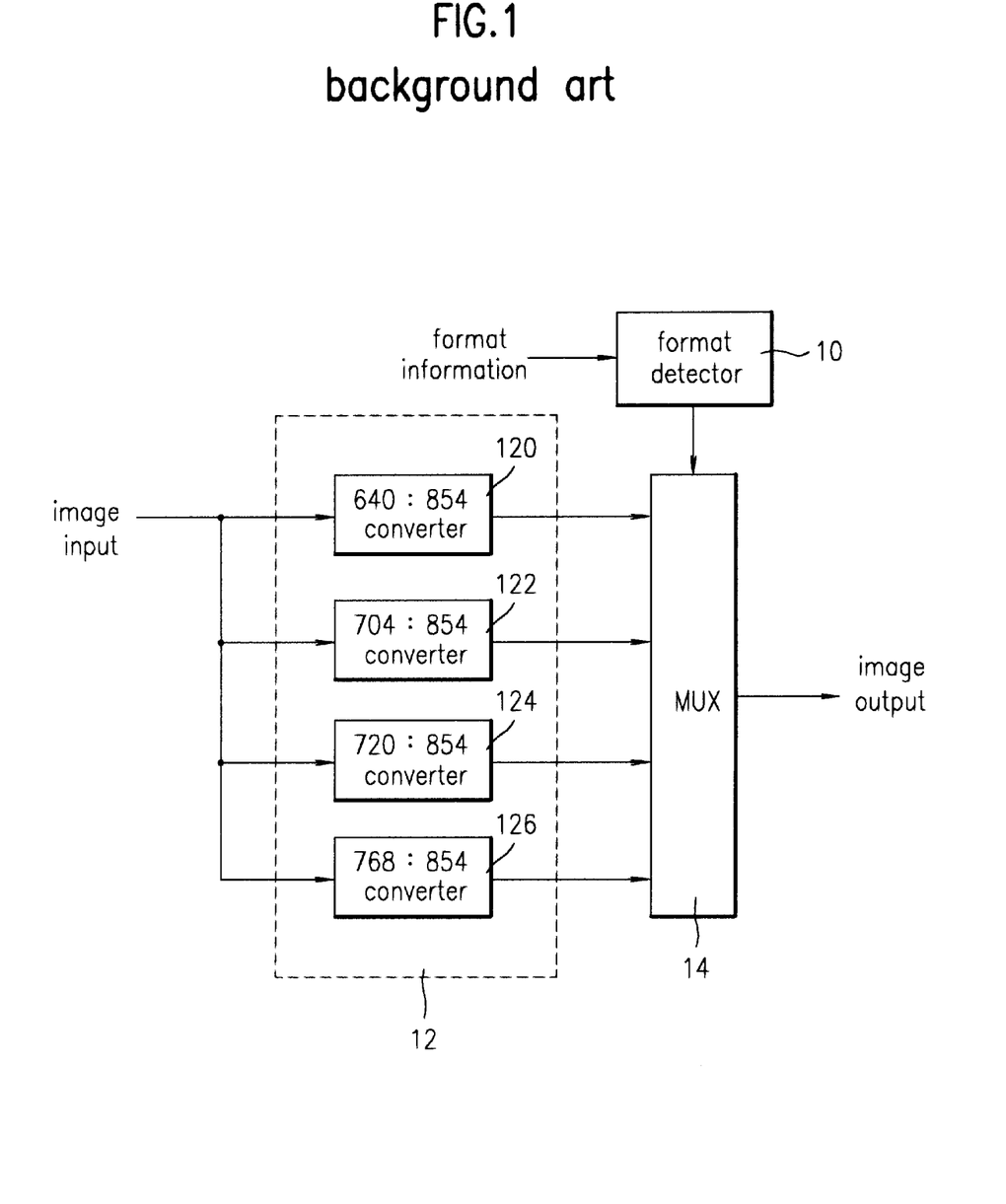
FIG. 1 is a block diagram of a general aspect ratio converting system.

FIG. 1 shows a system for converting the 4:3 input aspect ratio to a 16:9 display aspect ratio. Such system includes a format detector 10, a converters 12 consisting of a 640:854 converter 120, a 704:854 converter 122, a 720:854 converter 124, a 768:854 converter 126, and a multiplexer (MUX) 14. In operation, the format detector 10 receives input image with 4:3 aspect ratio and detects the image size. According to the detected size, the format detector 10 generates an output signal selecting the appropriate converter. The MUX 14 receives the output signal of the format detector 10 and output an image with 16:9 aspect ratio through converters 120, 122, 124, 126.

Generally, an image with 4:3 aspect ratio has 480 scanning lines with any one of the image sizes from 480×640, 480×704, 480×720 and 480×768. However, an image with a 6:9 aspect ratio has an image size of 480×854. Thus, depending on the input image size, one of converters 120, 122, 124, or 126 will be used to convert an image with a 4:3 aspect ratio to an image with 16:9 aspect ratio.

According to the past aspect ratio converting systems for a digital TV, different converters were used to convert each different image size. However, converters are difficult to manufacture and more importantly, it is difficult to output an image size of exactly 480×854 for 16:9 aspect ratio.

OBJECTIVES OF THE INVENTION

Thus, to solve the above mentioned problem, an object of the present invention is to employ simple converters to accurately convert from one aspect ratio to another.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWING

The invention will be described in detail with reference to the following drawings in which like reference numerals refer to like elements wherein.

DETAILED DESCRIPTION OF THE INVENTION

The preferred embodiment of the present invention includes a format detector for detecting the image size, a counter for counting the current pixel location included within the synchronization (sync) signal, a selector for establishing a rule to convert the input image according to the format detected and outputting a signal for selecting the appropriate converter to perform the conversion at the counted pixel location.

Figure 2:
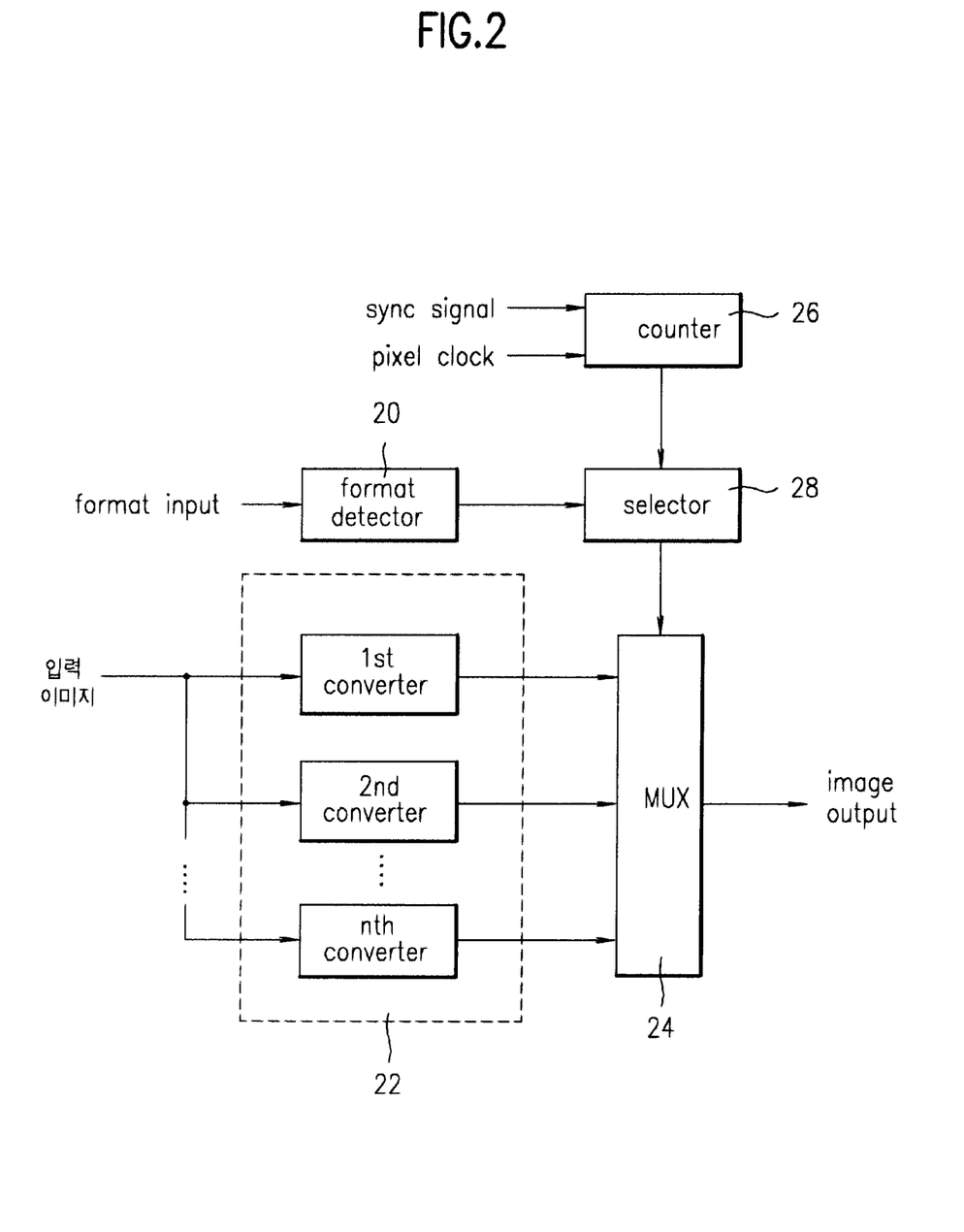
FIG. 2 is a block diagram of a preferred embodiment of a general converter from 4:3 to 16:9 aspect ratio.

FIG. 2 shows a preferred embodiment of a digital TV system for converting an image with a 4:3 aspect ratio to a 16:9 aspect ratio. The preferred embodiment includes a format detector 20 receiving the input format for an image with 4:3 aspect ratio and detecting the image size, a counter 26 counting the pixel location included in the sync signal, a selector 28 establishing a rule for converting the input image according to the format detected and outputting a control signal selecting a converter for performing the conversion at the pixel location, a converter 22 comprising of 1-n converters for dividing the incoming image into a plurality of pixel portions and achieving an image with 16:9 aspect ratio by interpolation, a MUX 24 selecting the converters 1-n according to the control signal from selector 28 and outputting the converted image.

Figure 3:
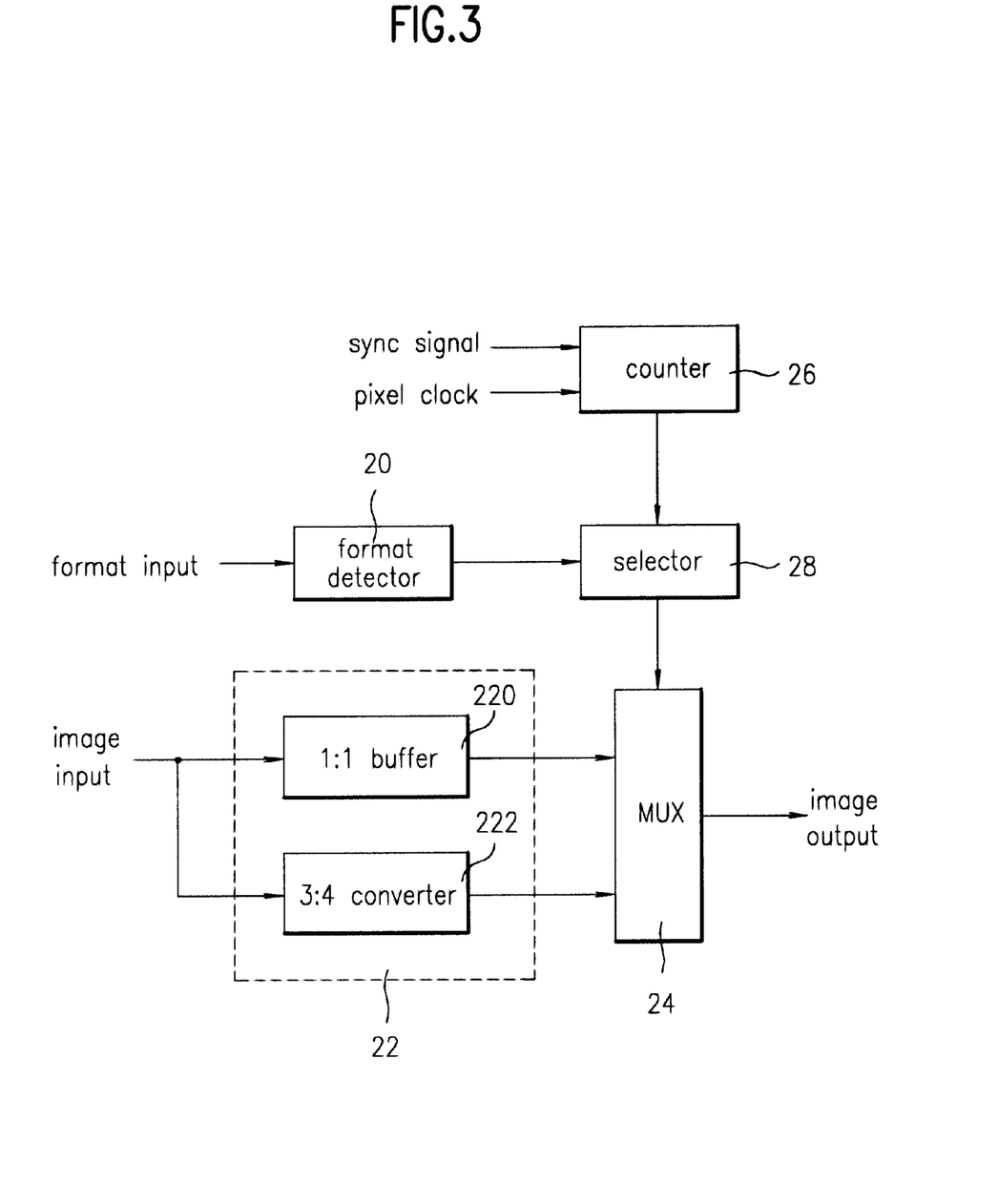
FIG. 3 is a block diagram of a preferred embodiment of a specific converter of FIG. 2.
Figure 4:
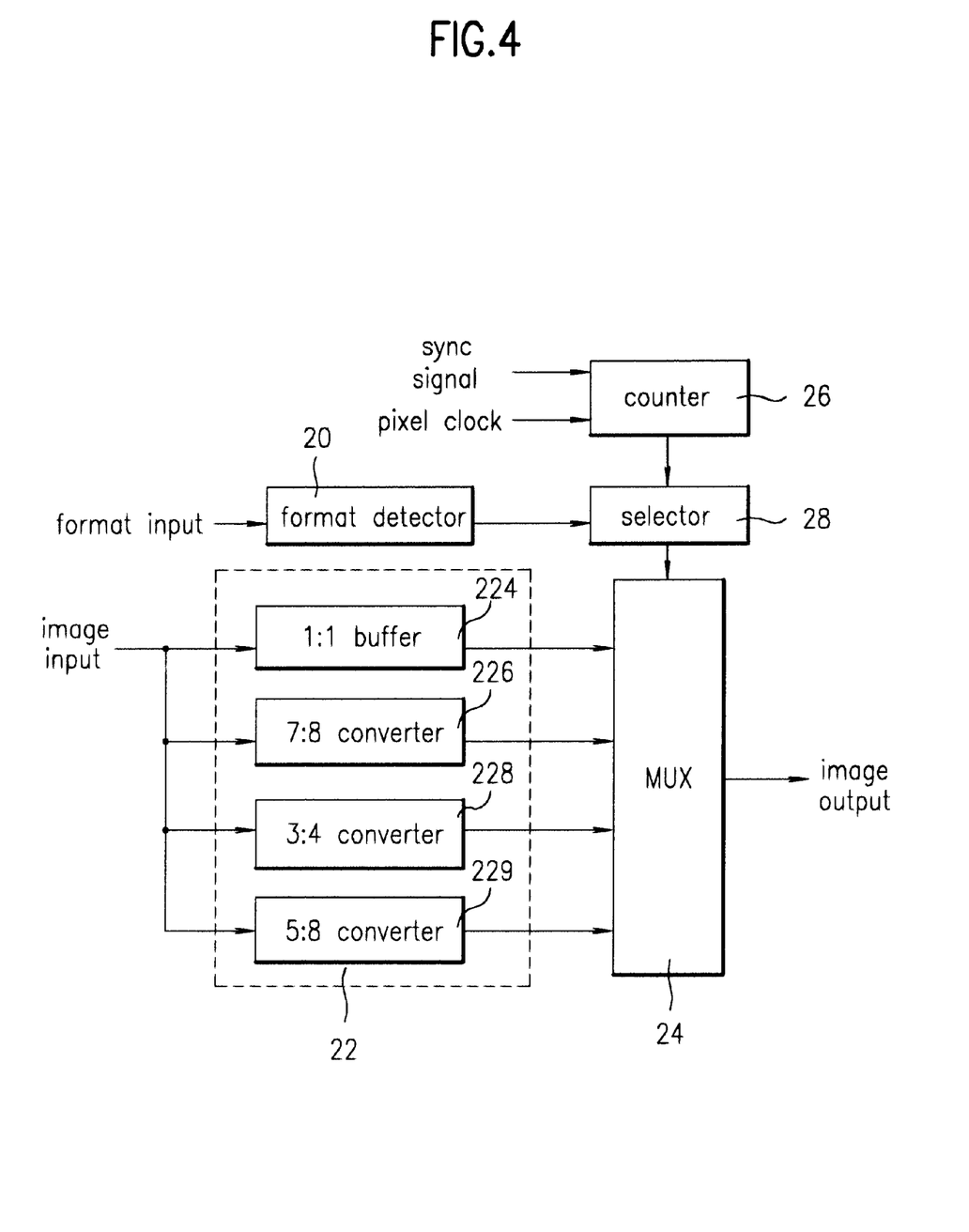
FIG. 4 is a block diagram of a preferred embodiment of a specific converter of FIG. 2 for high definition TV.

FIG. 3 shows a specific embodiment of the converter described with reference to FIG. 2, wherein the converter 22 comprises of a buffer 220 directly outputting the input image by a 1:1 ratio and a converter 222 interpolating the input image by a 3:4 ratio. FIG. 4 shows an alternative embodiment of the converter 22 for a high definition TV including a buffer 244 interpolating the input image by 1:1 ratio, a 7:8 converter 226 interpolating the image by 7:8 ratio, a 3:4 converter 228 interpolating the image by 3:4 ratio, and a 5:8 converter 229 interpolating the image by 5:8 ratio.

Figure 5:
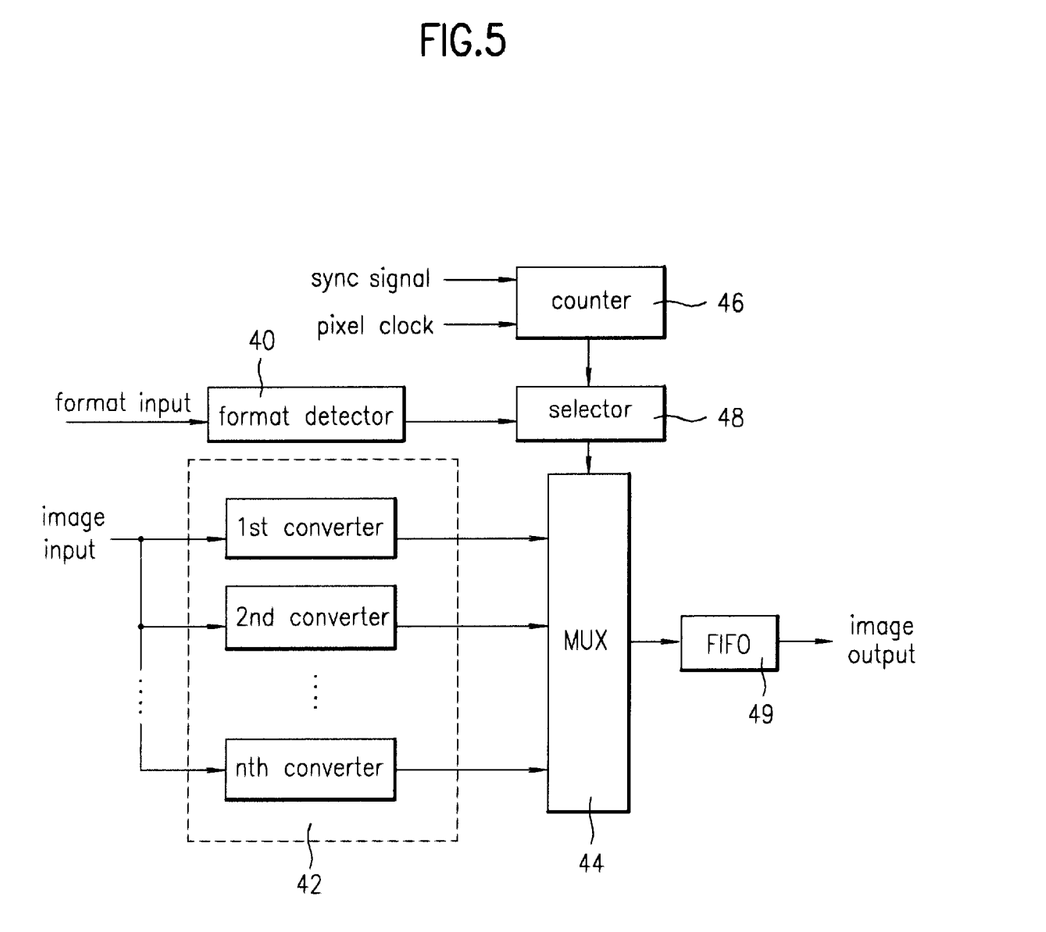
FIG. 5 is a block diagram of a preferred embodiment of a general converter from 16:9 to 4:3 aspect ratio.
Figure 6:
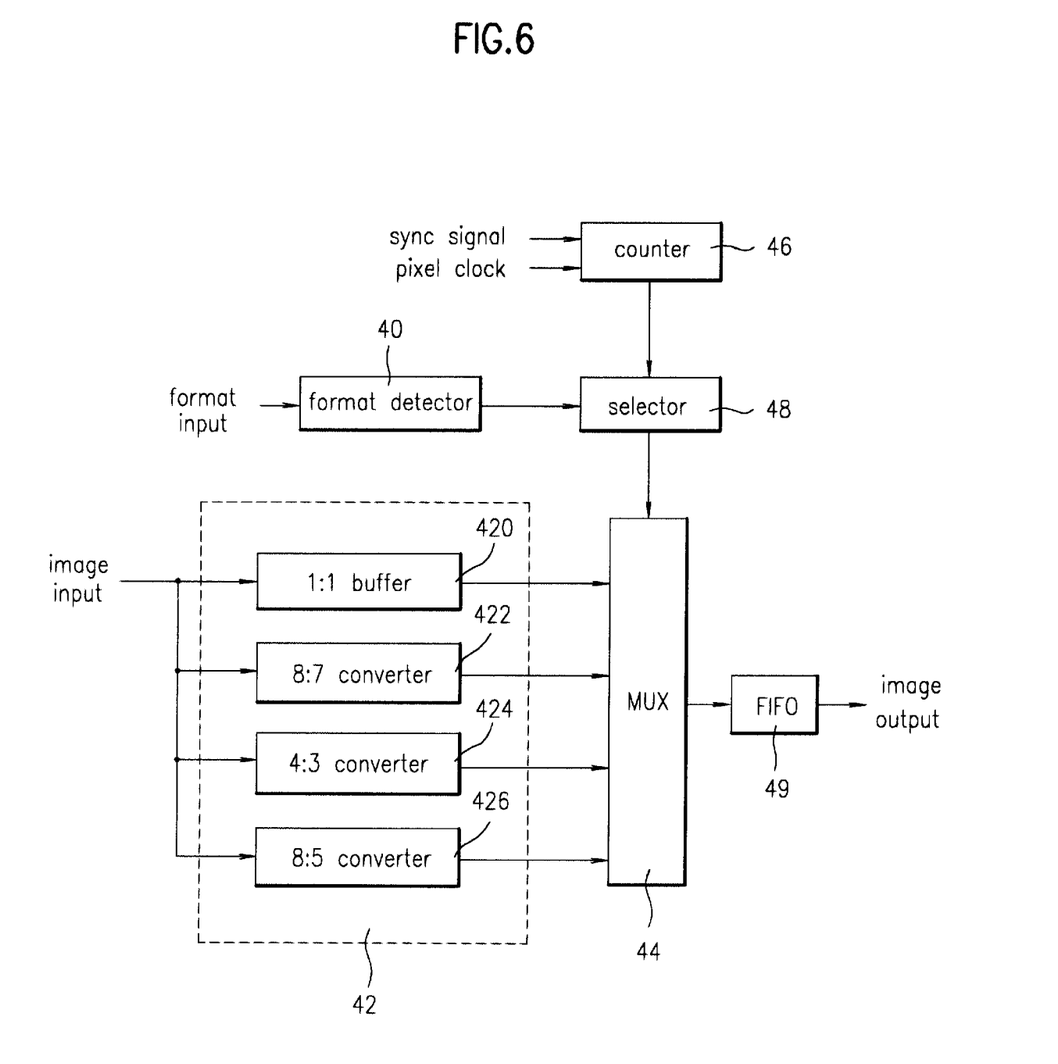
FIG. 6 is a block diagram of a preferred embodiment of a specific converter of FIG. 5 for high definition TV.

FIGS. 5 and 6 shows a preferred embodiment for converting an image with a 16:9 aspect ratio to 4:3 aspect ratio. The preferred embodiment includes a format detector 40 receiving the input image and detecting the image size, a counter 46 counting the pixel location included in the sync signal, selector 48 for establishing a rule for converting the input image according to the format detected and outputting a control signal selecting the appropriate converter for performing the conversion at the pixel location, a converter 42 comprising of 1-n converters for dividing the incoming image into a plurality of pixel portions and achieving an image with 4:3 aspect ratio by interpolation, a MUX 44 selecting the converters 1-n according to the control signal from selector 28 and outputting the converted image to a FIFO 49 which temporarily stores the output of the MUX 44.

FIG. 6 shows the preferred embodiment of the converter for a high definition TV. The converter 42 comprises a buffer 420 for outputting the image by 1:1 ratio, an 8:7 converter 426 interpolating the image by 8:7 ratio, a 4:3 converter 428 interpolating the image by 4:3 ratio, and an 8:5 converter 429 interpolating the image by 8:5 ratio. The operation of the present system will be explained using the following examples.

The image resolution of 480×640 has approximately Square pixels with an aspect ratio of 4:3. However, the resolutions of 480×704, 480×720, and 480×768 do not have Square pixels and may result in a normal image for one of the aspect ratio of 4:3 or 16:9.

The format detector 20 shown in FIGS. 2, 3, and 4 detects the image size of the input image with aspect ratio 4:3. The counter 26 is initiated by the sync signal and outputs the pixel location to selector 28. The selector 28 receives the pixel location and establishes a rule according to the pixel location and the detected image size. The selector 28 outputs a control signal selecting the appropriate converter according to the established rule. The MUX 24 receives the control signal and outputs the converted image by interpolating through the selected converter. Particularly, the input image with any one of the various image sizes is divided into a plurality of blocks according to the image size and each block is interpolated by different converters to produce an image with one fixed 16:9 aspect ratio.

Table 1 shows an example of a rule established by the selector of the system described with reference to FIG. 3, wherein the detected image size is 480×640. In such case, only the 3:4 converter 222 is selected through the MUX 24 and interpolated into an output image of 480×854.

TABLE 1

| Converter | 3:4 | Total |
| --- | --- | --- |
| Input pixel number | 640 | 640 |
| Output pixel number | 854 | 854 |

Table 2 shows an example of a rule established by the selector 28 wherein the detected image size is 480×704. Particularly, the pixels counted by the counter 26 are divided into three portions and the appropriate converters are selected for each of the three portions by the MUX 24. The left screen portion's 219 pixels are interpolated into 292 pixels by the 3:4 converter, the middle portion's 266 pixels are output through the buffer 220 and the right portion's 219 pixels are interpolated into 292 pixels by the 3:4 converter. Thus the total number of pixels output by the MUX 24 from an image size of 480×704 is 480×850 and the viewer would not be able to distinguish the difference from an image of 16:9 aspect ratio with 480×854.

TABLE 2

| Converter | 3:4 | 1:1 | 3:4 | Total |
| --- | --- | --- | --- | --- |
| Input Pixel Number | 219 | 266 | 219 | 704 |
| Output Pixel Number | 292 | 266 | 292 | 850 |

If more than two converters are used as shown in FIG. 4, the exact image size for a 16:9 aspect ratio can be produced as shown in Table 3.

TABLE 3

| Converter ratio | 5:8 | 3:4 | 7:8 | 1:1 | 7:8 | 3:4 | 5:8 | Total |
| --- | --- | --- | --- | --- | --- | --- | --- | --- |
| Input Pixel Number | 100 | 102 | 91 | 54 | 91 | 102 | 100 | 640 |

TABLE 3-continued

| Converter ratio | 5:8 | 3:4 | 7:8 | 1:1 | 7:8 | 3:4 | 5:8 | Total |
| --- | --- | --- | --- | --- | --- | --- | --- | --- |
| Output Pixel Number | 160 | 136 | 104 | 54 | 104 | 136 | 160 | 854 |

When the format detector 20 detects a 4:3 aspect ratio image size of 480×640, the selector 28 establishes a rule using the pixels counted by the counter 26 and selects the appropriate converter through MUX 24. Particularly, the first 100 pixels of the left screen portion are interpolated by the 5:8 converter into 160 pixels, the next 102 pixels from 101 to 202 of the left portion are interpolated by the 3:4 converter into 136 pixels, the next 91 pixels from 203 to 293 of the left screen portion are interpolated by the 7:8 converter into 104 pixels, the center 54 pixels from 294 to 347 are passed through the buffer, the next 91 pixels from 348 to 438 of the right screen are interpolated by the 7:8 converter into 104 pixels, the next 102 pixels from 439 to 540 of the right screen are interpolated by the 3:4 converter into 136 pixels, and the last 100 pixels of the right screen portion are interpolated by the 5:8 converter into 160 pixels. The input image is divided into seven pixel portions and interpolated by different converters to output a total of 854 pixels for the 480×854 image size of 16:9 aspect ratio.

For input image sizes of 480×704, 480×720, 480×468, the Tables 4–6 shows the rule established by selector 28 wherein the image is divided into seven pixel portions and interpolated to the 16:9 aspect ratio.

TABLE 4

| Converter ratio | 5:8 | 3:4 | 7:8 | 1:1 | 7:8 | 3:4 | 5:8 | Total |
| --- | --- | --- | --- | --- | --- | --- | --- | --- |
| Input Pixel Number | 65 | 66 | 98 | 246 | 98 | 66 | 65 | 704 |
| Output Pixel Number | 104 | 88 | 112 | 246 | 112 | 88 | 104 | 854 |

TABLE 5

| Converter ratio | 5:8 | 3:4 | 7:8 | 1:1 | 7:8 | 3:4 | 5:8 | Total |
| --- | --- | --- | --- | --- | --- | --- | --- | --- |
| Input Pixel Number | 55 | 66 | 84 | 310 | 84 | 66 | 55 | 720 |
| Output Pixel Number | 88 | 88 | 96 | 310 | 96 | 88 | 88 | 854 |

TABLE 6

| Converter ratio | 5:8 | 3:4 | 7:8 | 1:1 | 7:8 | 3:4 | 5:8 | Total |
| --- | --- | --- | --- | --- | --- | --- | --- | --- |
| Input Pixel Number | 35 | 30 | 84 | 470 | 84 | 30 | 35 | 768 |
| Output Pixel Number | 56 | 40 | 96 | 470 | 96 | 40 | 56 | 854 |

If the middle portion of the input image includes important data information, a 1:2 converter may be used in place of the 1:1 buffer, such that the middle portion would be enlarged. The above tables show some examples of rules for converting a 4:3 image to 16:9 image, but other image input sizes may also be converted.

Moreover, FIGS. 5 and 6 show a system for converting a 16:9 image to a 4:3 aspect ratio image. The format detector 40 detects the current image size of the aspect ratio 16:9. The counter 46 is initiated by the sync signal and outputs the pixel location to selector 48. The selector 48 receives the pixel location and establishes a rule according to the pixel location and the detected image size. The selector 48 outputs a control signal selecting the appropriate converter according to the established rule. The MUX 44 receives the control signal and outputs the converted image by interpolating through the selected converter. The FIFO 49 temporarily stores the selected output of MUX 44 before outputting the image. If the pixel clock input to converter 42 is faster than the display clock, FIFO 49 may be omitted. The converters of converter 42 may be manipulated to output a simple and high definition aspect ratio.

For high definition, FIG. 6 shows the preferred embodiment of the converter 42 comprising of a 1:1 converter 420 interpolating the image by 1:1 ratio, an 8:7 converter 422 interpolating the image by 8:7 ratio, a 4:3 converter 424 interpolating the image by 4:3 ratio, and an 8:5 converter 426 interpolating the image by 8:5. Similarly to the operation described for converting an image of 4:3 to 16:9 aspect ratio as described in reference to FIG. 4, an input image of 16:9 aspect ratio with resolution of 480×854 can be divided into seven pixel portions to be interpolated into an image of 4:3 aspect ratio with resolutions of 480×640, 480×704, 480×720, and 480×768 as shown in Tables 7–10 respectively.

TABLE 7

| Converter ratio | 8:5 | 4:3 | 8:7 | 1:1 | 8:7 | 4:3 | 8:5 | Total |
|---|---|---|---|---|---|---|---|---|
| Input Pixel Number | 160 | 136 | 104 | 54 | 104 | 136 | 160 | 854 |
| Output Pixel Number | 100 | 102 | 91 | 54 | 91 | 102 | 100 | 640 |

TABLE 8

| Converter ratio | 8:5 | 4:3 | 8:7 | 1:1 | 8:7 | 4:3 | 8:5 | Total |
|---|---|---|---|---|---|---|---|---|
| Input Pixel Number | 104 | 88 | 112 | 246 | 112 | 88 | 104 | 854 |
| Output Pixel Number | 65 | 66 | 98 | 246 | 98 | 66 | 65 | 704 |

TABLE 9

| Converter ratio | 8:5 | 4:3 | 8:7 | 1:1 | 8:7 | 4:3 | 8:5 | Total |
|---|---|---|---|---|---|---|---|---|
| Input Pixel Number | 88 | 88 | 96 | 310 | 96 | 88 | 88 | 854 |
| Output Pixel Number | 55 | 66 | 84 | 310 | 84 | 66 | 55 | 720 |

TABLE 10

| Converter ratio | 8:5 | 4:3 | 8:7 | 1:1 | 8:7 | 4:3 | 8:5 | Total |
|---|---|---|---|---|---|---|---|---|
| Input Pixel Number | 56 | 40 | 96 | 470 | 96 | 40 | 56 | 854 |
| Output Pixel Number | 35 | 30 | 84 | 470 | 84 | 30 | 35 | 768 |

The digital TV aspect ratio converting system according to the present invention employs a plurality of converters to interpolate different portions of pixel by location and converts various sizes of 4:3 aspect ratio image into a 16:9 aspect ratio image size. The system also converts a 16:9 aspect ratio image into a the various sizes of 4:3 aspect ratio images.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A circuit for converting one image size to another comprising:
    a plurality of converters receiving the input image;
    a first processor receiving the input image format information to divide the image into a plurality of portions, said first processor outputting a control signal selecting one of the plurality of converters for each one of the plurality of portions; and
    a second processor coupled to the plurality of converters and coupled to said first processor, said second processor receiving said control signal and outputting a converted image by selecting one of the plurality of converters for each of the plurality of portions according to said control signal.

2. A circuit of claim 1, wherein said second processor is a MUX.

3. A circuit of claim 1, wherein said first processor comprises:
    a format detector detecting the image size of the input image; and
    a analyzer dividing the input image into a plurality of portions and establishing a rule according to the detected image size for outputting a control signal selecting one of the plurality of converters for each of the plurality of portions.

4. A circuit of claim 3, wherein said analyzer comprises:
    a counter coupled to a pixel clock and receiving the sync signal, said counter counting the pixel location of the input image using the sync signal; and
    a selector coupled to said counter and dividing the input image into a plurality of pixel portions, said selector establishing a rule to output a control signal selecting one of the plurality of converters for each of the plurality of portions.

5. A circuit of claim 4 for converting an image of 4:3 to 16:9 aspect ratio, wherein said plurality of converters comprise:
    a buffer outputting the input image by a 1:1 ratio; and
    a 3:4 converter interpolating the input image by a 3:4 ratio.

6. A circuit of claim 4 for converting an image of 4:3 to 16:9 aspect ratio, wherein said plurality of converters comprise:

a buffer outputting the input image by a 1:1 ratio;

a 7:8 converter interpolating the input image by a 7:8 ratio;

a 5:8 converter interpolating the input image by a 5:8 ratio; and a 3:4 converter interpolating the input image by a 3:4 ratio.

7. A circuit of claim 4 for converting an image of 16:9 to 4:3 aspect ratio, further comprising a FIFO to temporarily store the output of said second processor.

8. A circuit of claim 7, wherein said plurality of converters comprise:

a buffer outputting the input image by a 1:1 ratio;

a 4:3 converter interpolating the input image by a 4:3 ratio.

9. A circuit of claim 7, wherein said plurality of converter comprise:

a buffer outputting the input image by a 1:1 ratio;

a 8:7 converter interpolating the input image by a 8:7 ratio;

a 8:5 converter interpolating the input image by a 8:5 ratio; and a 4:3 converter interpolating the input image by a 4:3 ratio.

10. A circuit for converting one image size to another comprising:

a plurality of converters receiving the input image;

a first processor receiving the input image to divide the image into a plurality of portions, said first processor outputting a control signal selecting one of the plurality of converters for each one of the plurality of portions; and a second processor coupled to the plurality of converters and coupled to said first processor, said second processor receiving said control signal and outputting a converted image by selecting one of the plurality of converters for each of the plurality of portions according to said control signal;

wherein said analyzer comprises a counter coupled to a pixel clock and receiving the sync signal, said counter counting the pixel location of the input image using the segment sync signal; and a selector coupled to said counter and dividing the input image into a plurality of pixel portions, said selector establishing a rule to output a control signal selecting one of the plurality of converters for each of the plurality of portions.

11. A circuit for converting an image size of 4:3 to 16:9 aspect ratio comprising:

a plurality of converters receiving the input image;

a first processor receiving the input image to divide the image into a plurality of portions, said first processor outputting a control signal selecting one of the plurality of converters for each one of the plurality of portions; and a second processor coupled to the plurality of converters and coupled to said first processor, said second processor receiving said control signal and outputting a converted image by selecting one of the plurality of converters for each of the plurality of portions according to said control signal;

wherein said analyzer comprises a counter coupled to a pixel clock and receiving the segment sync signal, said counter counting the pixel location of the input image using the segment sync signal; and a selector coupled to said counter and dividing the input image into a plurality of pixel portions, said selector establishing a rule to output a control signal selecting one of the plurality of converters for each of the plurality of portions; and wherein said plurality of converters comprises a buffer outputting the input image by a 1:1 ratio; and a 3:4 converter interpolating the input image by a 3:4 ratio.

12. A method for converting one image size to another comprising:

converting the input image with a plurality of converters;

receiving the input image format information to divide the image into a plurality of portions and outputting a control signal selecting one of the plurality of converters for each one of the plurality of portions; and a second processor receiving said control signal and outputting a converted image by selecting one of the plurality of converters for each of the plurality of portions according to said control signal.

* * * * *